UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

DRY BATTERY AND PROCESS OF MANUFACTURE.

1,397,183.  Specification of Letters Patent.  Patented Nov. 15, 1921.

No Drawing.  Application filed November 14, 1918. Serial No. 262,417.

*To all whom it may concern:*

Be it known that I, OTTO E. RUHOFF, a citizen of the United States, residing at Madison, in the county of Dane and State of Wisconsin, have invented a certain new and useful Improvement in Dry Batteries and Processes of Manufacture, of which the following is a specification.

This invention relates to dry batteries. As is well understood in the art, one type of battery is ordinarily composed of a core or bobbin consisting of a carbon pencil with depolarizing material compressed around it, said core or bobbin being inserted in approximately the center of a zinc can or case which forms one pole of the battery, the intervening space between the core or bobbin being then filled with an electrolyte which is usually initially a liquid when the battery is formed but shortly thereafter is made gelatinous, thereby making the battery a dry cell.

The object of the invention is to provide a novel means and method of constructing such a dry battery to insure easy and rapid construction of the battery without danger of short-circuiting the battery by contact between the core and the zinc at any time, this object being especially desirable when the core or bobbin is not wrapped in the customary cheese cloth or similar material, which cheese cloth can be omitted in modern construction when certain parts of the battery are chemically constituted in the manner hereafter set forth.

The invention consists in means for attaining the foregoing objects, which can be easily and cheaply taken advantage of, which is satisfactory in operation and is not readily liable to get out of order. More in detail, the invention consists in the features and details of construction which will be hereafter more fully set forth in the specification and claims.

In carrying out this invention, the operator provides himself with the zinc can common to the art, and a core or bobbin consisting of a carbon pencil with depolarizing material thereon. An electrolyte is prepared as follows: (*a*) dissolve 1034 grams of sal ammoniac in 1990 c. c. of 45° Baumé zinc chlorid solution; (*b*) dissolve 382 grams of sal ammoniac in 1307 c. c. of water; (*c*) make a thin paste by thoroughly mixing 50 grams of cornstarch and 200 c. c. of water; (*d*) then add this paste to the zinc chlorid and sal ammoniac solution (of step *a*) in a container suitable for thorough agitation and stir until all the starch paste is set or gelatinized; (*e*) then add the sal ammoniac solution (of step *b*) and agitate until the mixture is uniform and of a thin syrupy consistency. The mixture thus formed has the property of being sufficiently pasty to act on the surface of the core to keep out the water which otherwise might disintegrate the core in case the cheese cloth cover were omitted, but, nevertheless, is sufficiently fluid to facilitate the manufacture of the cell.

To the thin syrupy mixture, thus obtained, is added ordinary ungelatinized starch, flour, or other cereal in the proportion of 160 c. c. of the above mixture and 70 grams of corn starch or other cereal. The complete electrolyte mixture, still liquid, is now poured into the space between the core and zinc can, and the whole becomes gelatinous either by heating or standing for a sufficient length of time. If desired, a sufficient quantity of the electrolyte can be poured into the can, and the core, with suitable precautions, can then be inserted. The electrolyte can be allowed to gelatinize at room temperature, or any desired method may be employed for effecting gelatinization.

The use of this initially gelatinous material in the electrolyte prevents softening and disintegration of the material of the core, and the product can, therefore, be used in a battery in which the cheese cloth sack is omitted from the core, thus saving considerable expense. Under prior constructions, if the cheese cloth were omitted, the core would partially disintegrate before the whole mixture gelatinized.

The depolarizing mixture of the core usually comprises manganese dioxid, carbonaceous material, sal ammoniac and sufficient water for compacting purposes. Where the cheese-cloth covering is omitted, some binder ingredient of a sticky or cementitious character may be introduced before the compacting operation, if desired. A thin mixture of flour and water will serve, or some of the boiled syrupy fluid (of step *e*) may be employed for moistening the depolarizing mixture previous to the operation of forming the core.

The invention renders thoroughly practicable the use of a naked, or unwrapped core. This core can be introduced into the can in the manner set forth without danger of disintegration and without danger of short-circuiting the cell. Thus, the cost of manufacturing cells can be reduced, which is a matter of prime importance in an article which is used in very large numbers. A further advantage of this type of construction is that air is not trapped between the core and can and the electrolyte can establish contact at all points with the peripheral surfaces of core and can. Also, the internal resistance of the cell is somewhat lessened.

What I regard as new, and desire to secure by Letters Patent is:

1. A battery comprising a can, a core with depolarizing material thereon, and electrolyte containing initially gelatinous material preventing disintegration of the core.

2. A battery comprising a can, a core with depolarizing material thereon, and an electrolyte initially liquid, containing a small percentage of material initially gelatinized to prevent disintegration of the core and containing other material thereafter gelatinizing, for the purposes set forth.

3. A battery comprising a can, a core with depolarizing material thereon, and electrolyte containing initially gelatinous corn starch in sufficient quantity to prevent disintegration of the core and containing starch which gelatinizes thereafter.

4. A battery comprising a can, a core with depolarizing material thereon, and an electrolyte initially liquid, containing a small percentage of initially gelatinized corn starch adapted to prevent disintegration of the core and containing other corn starch thereafter gelatinizing, for the purposes set forth.

5. The process of manufacture of a dry cell, which comprises: preparing an electrolyte mixture containing a small percentage of initially gelatinized material; adding thereto gelatinizable material to complete the electrolyte mixture; and introducing a depolarizing core and the complete electrolyte mixture into a zinc can.

6. The process of manufacture of a dry cell, which comprises: preparing an electrolyte mixture comprising a solution of sal ammoniac and zinc chlorid and a small percentage of initially gelatinized starch, adding thereto ungelatinized starch sufficient to complete the electrolyte mixture; and introducing a depolarizing core and the complete electrolyte mixture into a zinc can.

7. The process of manufacture of a dry cell, which comprises: preparing a solution of sal ammoniac and zinc chlorid; preparing a solution of sal ammoniac and water; preparing a thin paste comprising starch and water; mixing the paste with the solution of sal ammoniac and zinc chlorid and causing gelatinization of the starch; adding the solution of sal ammoniac and water, thus producing a thin syrupy fluid; adding sufficient ungelatinized starch to complete the electrolyte mixture; and introducing a depolarizing core and the complete electrolyte mixture into a zinc can.

In witness whereof, I have hereunto subscribed my name in the presence of two witnesses.

OTTO E. RUHOFF.

Witnesses:
DWIGHT B. CHEEVER,
M. S. ROSENZWEIG.